US010589254B2

United States Patent
Plecha et al.

(10) Patent No.: US 10,589,254 B2
(45) Date of Patent: *Mar. 17, 2020

(54) SPHEROIDAL RESID HYDRODEMETALLATION CATALYST

(71) Applicant: Advanced Refining Technologies LLC, Columbia, MD (US)

(72) Inventors: Stanislaw Plecha, Columbia, MD (US); Narinobu Kagami, Chiba (JP); Viorel D. Duma, Hercules, CA (US); John Everett Creighton, Woodstock, MD (US)

(73) Assignee: Advanced Refining Technologies LLC, Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/285,775

(22) Filed: Feb. 26, 2019

(65) Prior Publication Data

US 2019/0184376 A1 Jun. 20, 2019

Related U.S. Application Data

(63) Continuation of application No. 14/378,894, filed as application No. PCT/US2013/026323 on Feb. 15, 2013, now Pat. No. 10,279,335.

(60) Provisional application No. 61/600,024, filed on Feb. 17, 2012.

(51) Int. Cl.

| B01J 21/06 | (2006.01) |
| B01J 37/03 | (2006.01) |
| B01J 27/19 | (2006.01) |
| B01J 35/08 | (2006.01) |
| B01J 35/10 | (2006.01) |
| B01J 37/02 | (2006.01) |
| C10G 45/04 | (2006.01) |
| B01J 37/08 | (2006.01) |
| C10G 45/08 | (2006.01) |

(52) U.S. Cl.
CPC ............ *B01J 21/063* (2013.01); *B01J 27/19* (2013.01); *B01J 35/08* (2013.01); *B01J 35/1014* (2013.01); *B01J 35/1019* (2013.01); *B01J 35/1042* (2013.01); *B01J 35/1047* (2013.01); *B01J 35/1061* (2013.01); *B01J 37/0201* (2013.01); *B01J 37/0207* (2013.01); *B01J 37/031* (2013.01); *B01J 37/08* (2013.01); *C10G 45/04* (2013.01); *C10G 45/08* (2013.01)

(58) Field of Classification Search
None
See application file for complete search history.

(56) References Cited

U.S. PATENT DOCUMENTS

| 3,401,125 A | 9/1968 | Jaffee |
| 3,524,808 A | 8/1970 | Quik et al. |
| 3,956,105 A | 5/1976 | Conway |
| 4,003,826 A * | 1/1977 | Antos ............... B01J 23/622 208/139 |
| 4,066,574 A | 1/1978 | Tamm |
| 4,113,661 A | 9/1978 | Tamm |
| 4,116,882 A | 9/1978 | Bendig et al. |
| 4,154,812 A | 5/1979 | Sanchez et al. |
| 4,179,408 A | 12/1979 | Sanchez et al. |
| 4,270,779 A | 6/1981 | Watts |
| 4,341,625 A | 7/1982 | Tamm |
| 4,440,631 A * | 4/1984 | Togari ............... B01J 23/22 208/112 |
| 4,465,790 A * | 8/1984 | Quayle ............... C10G 45/08 502/309 |
| 4,568,657 A | 2/1986 | Sepulveda et al. |
| 4,587,012 A | 5/1986 | Quann |
| 4,686,030 A | 8/1987 | Ward |
| 4,976,848 A | 12/1990 | Johnson |
| 5,089,463 A | 2/1992 | Johnson |
| 5,229,347 A | 7/1993 | Prada et al. |

(Continued)

FOREIGN PATENT DOCUMENTS

| CN | 1050736 A | 4/1991 |
| CN | 101199935 A | 6/2008 |

(Continued)

OTHER PUBLICATIONS

Sautes et al, Catalytic hydrotreating of heavy gasoil FCC feedon alumina-titania-supported NiMo catalysts, applied catalysis A: general 281, pp. 121-128 (Year: 2005).*

(Continued)

*Primary Examiner* — Melvin C. Mayes
*Assistant Examiner* — Stefanie J Cohen
(74) *Attorney, Agent, or Firm* — Lerner, David, Littenberg, Krumholz & Mentlik, LLP

(57) ABSTRACT

Spheroidal catalyst support, supported catalyst, and method of preparing and using the catalyst for hydrodemetallation of metal-containing heavy oil feedstocks are disclosed. The catalyst supports comprise titania alumina having 5 wt % or less titania and have greater than 30% percent of their pore volume in pores having a diameter of between 200 and 500 Å. Catalysts prepared from the supports contain Group 6, 9 and 10 metals or metal compounds supported on the titania alumina supports. Catalysts in accordance with the invention exhibit improved catalytic activity and stability to remove metals from heavy feedstocks during a hydrotreating process. The catalysts also provide increased sulfur and MCR conversion during a hydrotreating process.

15 Claims, No Drawings

(56) References Cited

U.S. PATENT DOCUMENTS

| | | | |
|---|---|---|---|
| 5,435,908 A | | 7/1995 | Nelson et al. |
| 5,545,602 A | | 8/1996 | Nelson et al. |
| 5,888,380 A | * | 3/1999 | Fujita .................. B01J 21/04 |
| | | | 208/216 PP |
| 6,036,847 A | | 3/2000 | Ziebarth et al. |
| 6,383,975 B1 | | 5/2002 | Rocha et al. |
| 8,025,532 B2 | | 9/2011 | Nagata et al. |
| 9,067,191 B2 | | 6/2015 | Seki et al. |
| 2005/0234137 A1 | | 10/2005 | Espinoza et al. |
| 2006/0011510 A1 | | 1/2006 | Toshima et al. |
| 2006/0025608 A1 | | 2/2006 | Hutchenson et al. |
| 2006/0231456 A1 | | 10/2006 | Bhan |
| 2010/0279854 A1 | | 11/2010 | Kuperman et al. |
| 2011/0218097 A1 | | 9/2011 | Rayo Mayoral et al. |
| 2012/0181219 A1 | | 7/2012 | Seki et al. |

FOREIGN PATENT DOCUMENTS

| | | |
|---|---|---|
| CN | 101890380 A | 11/2010 |
| CN | 101890382 A | 11/2010 |
| CN | 102197115 A | 9/2011 |
| EP | 0339640 A1 | 11/1989 |
| EP | 0512778 A1 | 11/1992 |
| GB | 1569525 A | 6/1980 |
| GB | 2121699 A | 1/1984 |
| JP | S53119800 A | 10/1978 |
| JP | S56120508 A | 9/1981 |
| JP | 58-219293 | 12/1983 |
| JP | 02014818 | 1/1990 |
| JP | 5192575 A | 8/1993 |
| JP | H10118495 A | 5/1998 |
| JP | 2004148139 A | 5/2004 |
| JP | 2008503611 A | 2/2008 |
| WO | 2010033487 A2 | 3/2010 |
| WO | 20110040224 A1 | 4/2011 |
| WO | 20130123166 A1 | 8/2013 |

OTHER PUBLICATIONS

Brunauer et al., "Adsorption of gases in multimolecular layers", Emmett and Teller in J. Am. Chem. Soc. 60 (1938) 309-319.
English translation JP02014818.
Fuqiang Deng et al., Application of ultra-fine supported Ni—Mo/Al2O3 catalyst in residue hydrocracking, Petroleum Refinery Engineering, May 31, 2010, pp. 47-50 (English translation of Abstract provided.).
International Search Report and Written Opinion for Application No. PCT/US13/46753 dated Nov. 14, 2013.
International Search Report for Application No. PCT/US2013/026108 dated Apr. 26, 2013.
International Search Report for Application No. PCT/US2013/026323 dated Apr. 26, 2013.
Ramirez J et al, "Titania-Alumina Mixed Oxides as Supports for Molybdenum Hydrotreating Catalysts", Applied Catalysis A: General, Elsevier Science, Amsterdam, NL, (Jan. 1, 1993), vol. 93, No. 2, XP001181704, pp. 163-180.
S.K. Maity et al.: "Alumina-titania binary mixed oxide used as support for hydrotreating of Maya heavy crude", Applied Catalysis A: General, vol. 244, (2003), No. 30, pp. 141-153, (30.153.141).
Santes et al, Catalytic hydrotreating of heavy gasoil FCC feed on alumina-titania-supported NiMo catalysts, Applied Catalysis A: General, Mar. 2005, vol. 281, Issues 1-2 pp. 121-128.
Wenyuan Ye et al., Comparison of hydrodesulfurization schemes for residue feedstock with high contents of sulfur, metal and carbon residue, Petroleum Processing and Petrochemicals, Jun. 30, 1995, vol. 26, No. 6, pp. 26-31 (English translation of Abstract provided.).
Chinese Search Report for Application No. 201710769536.3 dated Aug. 14, 2019, pp. 1-4.
Dadong, Hydrotreating Process and Engineering, China Petrochemical Press, Dec. 2004, pp. 469-470.

* cited by examiner

SPHEROIDAL RESID HYDRODEMETALLATION CATALYST

CROSS REFERENCE TO RELATED APPLICATIONS

The present application is a continuation of U.S. patent application Ser. No. 14/378,894, filed Aug. 14, 2014, which is a national phase entry under 35 U.S.C. § 371 of International Application No. PCT/US2013/026323 filed Feb. 15, 2013, published in English, which claims priority from U.S. Provisional Patent Application No. 61/600,024 filed Feb. 17, 2012, all of which are incorporated herein by reference.

FIELD OF THE INVENTION

The present invention relates to the catalytic hydrotreating of liquid hydrocarbon containing feed streams. In particular, the present invention relates to a catalyst carrier, catalyst compositions prepared using the carrier, a method of preparing the catalyst compositions and a process of reducing the metals content of a hydrocarbon heavy feedstock using the aforementioned catalyst compositions.

BACKGROUND OF THE INVENTION

In the petroleum refining industry it is often useful to upgrade certain oil and fractions like heavy oils and residuum by hydrotreating. Examples of such hydrotreating processes are hydrodemetallation, desulfurization, and denitrogenation. In these processes the feedstock is contacted with a hydroconversion catalyst in the presence of hydrogen at elevated pressure and temperature. Due to strict demands imposed by ecological regulations, the refining industry has become increasingly more focused on producing high quality cleaner fuels with a minimum content of contaminants such as sulfur, nitrogen and heavy metals.

Catalysts used in hydrotreating processes generally comprise catalytically active metals from Groups 6, 9 and 10 of The Periodic Table and are typically supported on alumina, which may be combined with other inorganic refractory materials such as silica, magnesia, titania, zirconia and the like. Secondary promoters or additives, such as halogens, phosphorous and boron, have also been used to enhance catalytic properties. To achieve the maximum effect from hydrotreating processes, it is necessary to optimize catalyst activity and selectivity to a desired hydrotreating reaction. Catalyst activity and selectivity are determined and affected by such factors as the nature and properties of the catalyst support, the catalytic agents, activity and selectivity of promoters as well as the preparation and activation method used.

Where heavy feedstocks contain organometallic compounds, the effectiveness of the hydrotreating as well as downstream catalysts tend to decline relatively rapidly, particularly when the impurity is more than about 10 to 20 ppm metals such as dissolved nickel and vanadium. These metallic impurities are said to deposit on the surface and in the pores of these catalysts reducing their effectiveness. One approach to the problem of metal impurity has been to alter the pore structure of the hydrotreating catalyst. However, the determination as to which pore structure to use is unpredictable and not easily obtained. There is yet a conflict in the art regarding optimal pore structure. Several patents which have discussed this conflict include U.S. Pat. Nos. 4,066,574; 4,113,661 and 4,341,625.

Hydrotreated hydrocarbon feedstocks having a low Conradson carbon residue are also highly desirable in the refining industry. Carbon residue is a measurement of the tendency of a hydrocarbon to form coke. Expressed in weight percent, carbon residue may be measured as microcarbon residue (MCR). The MCR content in a hydrotreated residual feedstock is an important parameter since the hydrotreated residue usually acts as feed to a coker or a fluid catalytic cracking (FCC) unit. Decreasing the MCR content in the hydrotreated residue decreases the amount of low value coke generated in the coker and increases the amount of gasoline generated in the FCC unit.

To this end, there remains a need to develop catalyst compositions that are less expensive and/or more effective in removing metal contaminants from hydrocarbons feed streams, in particularly heavy hydrocarbon feed streams, than catalysts presently employed. There also remains a need for improved hydrodemetallation and/or hydrodesulfurization catalysts which provide good MCR conversion during a hydrotreating process.

SUMMARY OF THE INVENTION

The present invention is based on the discovery that the high temperature calcination of a titania alumina material containing 5 wt % or less titania (based on the total weight of titania alumina) unexpectedly provide spheroidal catalyst supports having a unique pore structure from which supported catalysts having increased catalytic activity and stability to remove metals during a hydrotreating process may be prepared. Advantageously, the supports of the invention offer the economical benefit of lower cost since catalyst compositions prepared from the supports have improved catalytic performance while maintaining a low catalytically active metal content.

In one aspect of the present invention, a spheroidal titania alumina support having a distinct pore structure is provided. The support of the invention has a pore size distribution as determined by mercury penetration porosimetry satisfying the following: a total pore volume in the range of from about 0.7 to about 1.2 cc/g, with greater than 40% of the total pore volume having pores in a diameter larger than 200 Å, about 30% or more of the total pore volume having pores in the range of about 200 Å to about 500 Å and, greater than 10% of the total pore volume having pores with a diameter above 1000 Å.

The present invention also provides a spheroidal titania alumina support which comprises at least 90 wt % of a titania alumina having an alumina R value of from about 0.4 to about 1.7, the R value being defined as the ratio between the integrated intensity of the X-ray diffraction peak at $2\theta=32°$ and the integrated intensity of the X-ray diffraction peak at $2\theta=46°$.

In another aspect of the present invention improved hydrotreating catalysts for reducing the content of metals of a heavy hydrocarbon feed stock containing metals during a hydrotreating process are provided. In accordance with the invention the catalyst are prepared by impregnating catalytically active Group 6, 9 and 10 metals or metal compounds, and optionally phosphorous compounds, on a support in accordance with the invention.

The present invention also provides improved hydrotreating catalysts which have the ability to reduce the content of metals simultaneously with reducing the content of sulfur and the MCR of a heavy hydrocarbon during a hydrotreating process.

Yet another aspect of this invention provides a method of making spheroidal titania alumina supports having a distinctive pore size distribution using a gelation oil-drop process in a dripping column.

Another aspect of the present invention provides a method of making a spheroidal catalyst composition comprising a spheroidal titania alumina support, which support comprises at least 90 wt % titania alumina having an R value of from about 0.4 to about 1.7 and containing 5 wt % or less titania, based on the total weight of titania alumina.

The present invention further provides improved hydrotreating processes using spheroidal supported catalyst compositions and processes of the present invention.

These and other aspects and embodiments of the present invention are described in further details below.

DETAILED DESCRIPTION OF OF THE INVENTION

The present invention provide spheroidal catalyst compositions comprised of catalytically active metals or metal compounds of Groups 6, 9 and 10 of The Periodic Table, and optionally, phosphorous compounds supported on a spheroidal titania alumina support in accordance with the invention. In one embodiment of the invention, the support material used to prepare the catalyst of the invention generally comprises a titania alumina which contains 5 wt % or less titania, based on the total weight of the titania alumina. In another embodiment of the invention the titania alumina comprises from about 2.5 to about 4 wt % titania, based on the total weight of the titania alumina. In yet another embodiment of the invention, the titania alumina comprises from about 0.3 to about 1 wt % titania.

In a preferred embodiment of the invention, the titania alumina used to prepare the supports of the invention comprises at least 90 wt. % of an alumina having a mixture of gamma-alumina and delta- and/or theta-alumina, such that the titania alumina composition is reflected by an alumina R value in the range of from about 0.4 to about 1.7, preferably from about 0.6 to about 1.4. The term "R value" as used herein is used to indicate the ratio between the integrated intensity of the X-ray diffraction peak at $2\theta=32°$ and the integrated intensity of the X-ray diffraction peak at $2\theta=46°$. R values are determined by a method as disclosed and described in U.S. Pat. No. 5,888,380, the entire contents of which is herein incorporated by reference.

The R value can be expressed in by the formula:

$$R = \frac{[I(2\theta) = 32°]}{[I(2\theta) = 46°]}$$

in which $[I(2\theta)=32°]$ and $[I(2\theta)=46°]$ stand for the integrated intensity of the peak at a $2\theta$ angle of the X-ray diffraction spectrum at 32° and 46°, and 46°, respectively. In the present specification, use is made of a PANalytical X'Pert X-RAY DIFFRACTOMETER. The following measurement conditions and apparatus were used: CuK alpha-ray vessel, vessel voltage 50 kV, vessel current 30 mA, double axis vertical goniometer, scanning rate 0.867°/min, emitting slit width 1°, scattering slit width, 1°, receiving slit width 0.3 mm, $2\theta$ angle $4°\leq 2\theta \leq 82°$. The peak which appears at $2\theta=46°$ is due to gamma-alumina, while the peak appearing at $2\theta=32°$ is due to delta- and/or theta-alumina. At this angle the latter two alumina types cannot be distinguished from each other by way of X-ray diffraction. The two peaks at $2\theta=46°$ and $2\theta=32°$ do not overlap and can therefore be readily integrated to calculate the integrated intensity. In calculating the integrated intensity, the background intensity is not taken into account, as is well known to the person skilled in the art.

In this respect it is noted that the R value should be determined on a support, on which no catalytically active metals are present.

The spheroidal titania alumina supports in accordance with the present invention generally comprise at least 90 wt % of titania alumina as described herein. Preferably, the support material comprises at least 95 wt %, most preferably, greater than 99 wt % of the titania alumina, said weight percent being based on the total weight percent of the support. The support material thus can "consist essentially of" the titania alumina as described herein. The phrase "consist essentially of" as used herein with regard to the composition of the support material is used herein to indicate that the support material may contain the titania alumina and other components, provided that such other components do not materially affect or influence the catalytic properties of the final hydroconversion composition.

Spheroidal titania alumina supports of the present invention possess specific properties of surface area, pore volume and pore volume distribution. Unless otherwise specified herein, the pore volume and pore size distribution properties of the titania alumina supports as defined herein are determined by mercury penetration porosimetry. The mercury measurement of the pore volume and the pore size distribution of the alumina support material is performed using any suitable mercury porosimeter capable of a pressure range of atmospheric pressure to about 4,000 bar, with a contact angle, $\theta=140°$ and with a mercury surface tension of 0.47 N/m at room temperature.

Surface area as defined herein is determined by BET surface area analysis. The BET method of measuring surface area is described in detail in an article by Brunauer, Emmett and Teller in *J. Am. Chem. Soc.* 60 (1938) 309-319, which article is incorporated herein by reference.

The surface area of the titania alumina support ranges from about 80 $m^2/g$ to about 150 $m^2/g$. In a preferred embodiment of the invention, the surface area of the titania supports ranges from about 90 $m^2/g$ to about 130 $m^2/g$.

Generally, supports of the invention have a total pore volume in the range of from about 0.6 cc/g to about 1.2 cc/g. In a preferred embodiment of the invention, the total pore volume of the supports ranges from about 0.8 to about 1.1 cc/g.

The support of the invention has a distinct pore volume distribution such that generally greater than 40% of the total pore volume have pores in a diameter larger than 200 Å, with about 30% or greater of the total pore volume having pores in a diameter in the range of about 200 Å to about 500 Å and, greater than 10% of the total pore volume having pores with a diameter above 1000 Å.

In one embodiment of the invention, about 50% to about 90% of the total pore volume of the supports has pores in a diameter larger than 200 Å.

In another embodiment of the invention, about 30% to about 80% of the total pore volume of the supports has pores with a diameter ranging from about 200 Å to about 500 Å.

In yet another embodiment of the invention, greater than about 15% of the total pore volume has pores with a diameter above 1000 Å.

Spheroidal titania alumina supports of the invention have a general spherical or oblate shape and may be in the form of pellets, extrudates, and the like. The supports of the invention may be prepared by any conventional method in the catalyst arts useful for making a spheroidal shaped support, provided however that the final support have the desired pore structure. Generally, supports of the invention are prepared by a process comprising co-precipitating a titania alumina containing 5 wt % or less titania under specific and controlled conditions of reaction temperature, time, and pH. In a preferred embodiment of this invention, the titania alumina spheroidal support is prepared by an external gelation oil-drop process as disclosed and described in U.S. Pat. No. 4,270,779, said reference incorporated herein in its entirety by reference. In the titania-alumina co-precipitation process, a sufficient amount of an aqueous aluminum sulfate and titanium sulfate mixture is added simultaneously with sodium aluminate to a water heel at a temperature of about 50° C. to about 80° C. to precipitate titania-alumina having 5 wt % or less titania in the co-precipitated titania-alumina. During the precipitation step, the pH of the slurry is maintained at about 7.2 to about 9.0 and the temperature is maintained from about 50° C. to about 80° C. At the end of the precipitation step, the pH of the slurry is adjusted to about 8.6 to about 9.3 to enable maximum removal of residual impurities, e.g. soda and sulfates. Thereafter, the co-precipitated titania alumina is filtered, washed with water and dried to provide a titania alumina having a moisture content from about 22 wt % to about 40 wt %, preferably from about 25 wt % to about 32 wt %, as determined by a moisture analyzer at 955° C.

The dried titania alumina is thereafter peptized by mixing with a suitable peptizing agent to form an aqueous acidic titania alumina slurry containing from about 20% to about 35, preferably from about 22% to about 30% solids. Droplets of the slurry are thereafter passed through air into a suitable dripping column containing an upper body of a water immiscible liquid, e.g. kerosene, toluene, heavy naptha, light gas oil, paraffin oil and the like, and anhydrous ammonia and a lower body of aqueous alkaline coagulating agent, e.g. ammonium hydroxide solution, to form spheroidal particles. The titania alumina spheroids are dried to a total moisture content of about 20 wt % to 35 wt % and are thereafter calcined at a high temperature ranging from about 960° C. to 1100° C., preferably from about 980° C. to about 1060° C., for about 1 hour to about 3 hours, to obtain a final titania alumina spheroidal support having the desired pore structure.

Optionally, the titania alumina slurry is aged with agitation prior to formation of the droplet in the dripping column. Agitation and aging of the slurry aid in forming a uniform material with a viscosity that permits proper formation of droplets from which the spheroids can be formed. For droplet formation, slurry viscosities of about 300 to about 2000 cps, preferably about 600 to about 1500 cps are suitable. Agitation of the slurry may be accomplished by a variety of means ranging from hand stirring to mechanical high shear mixing. Following agitation, the slurry is aged from a few minutes to many days. Preferably, the slurry is aged for about 1 hr to about 3 hrs.

The length of the column can vary widely and will usually range from about 10 to about 30 feet in height. The organic phase may generally comprise from about 30% to about 60% of the column length and the coagulation phase the remainder. As will be understood by the one skilled in the arts, the cross sectional area of the dripping column will vary depending upon the number of droplet nozzles used. Typically, the cross sectional area of the column ranges from about 50 inch squared to about 500 inch squared.

Suitable peptizing agents useful to prepare the supports of the invention include, but are not limited to, nitric acid, acetic acid, hydrochloric acid and other strong monobasic acids. In a preferred embodiment of the invention, the peptizing agent is a mixture of nitric acid and acetic acid.

Spheroidal supports in accordance with the invention may have various sizes. Generally the support has an average particle size ranging from about 0.5 mm to about 15 mm. In a preferred embodiment of the invention, the spheroid support has a diameter ranging from about 1 to about 10 mm. In a more preferred embodiment the diameter ranges from 2 to about 5 mm. As will be understood by one skilled in the catalyst arts, catalyst particles produced from the supports will have a similar size and shape as the support.

Catalysts in accordance with the invention are prepared by contacting titania alumina supports of the invention with an aqueous solution of at least one catalytically active metal or precursor compound to uniformly distribute the desired metal on the support. Preferably, the metal is distributed uniformly throughout the pores of the support. In one embodiment of the invention, the catalysts are prepared by impregnation of the catalyst supports to incipient wetness with an aqueous solution of the desired catalytically active metal or precursor metal compound.

Catalytically active metal and/or precursor metals compounds useful to prepare the catalyst composition of the invention, include, but are not limited to metals or compounds of metals selected from the group consisting of Group 6 of The Periodic Table, Group 9 of The Periodic Table, Group 10 of The Periodic Table and combinations thereof. Preferred Group 6 metals include, but are not limited to, molybdenum and tungsten. Preferred Groups 9 and 10 metals include, but are not limited to, cobalt and nickel.

Concentrations of Group 6 metals and/or metal compounds useful to prepared catalyst composition of the present invention typically is an amount sufficient to provide from about 1 wt % to about 10 wt % of the desired Group 6 metal, preferably from about 2 wt % to about 5 wt %, in the total catalyst composition. Concentrations of Group 9 metals and/or metal compounds useful to prepare the catalyst compositions of the present invention typically is an amount sufficient to provide from about 0 wt % to about 5 wt % of the desired Group 9 metal, preferably from about 0.5 wt % to about 2 wt %, in the total catalyst composition. Concentrations of Group 10 metals and/or metal compounds useful to prepare the catalyst compositions of the present invention typically is an amount sufficient to provide from about 0 wt % to about 5 wt % of the desired Group 10 metal, preferably from about 0.5 wt % to about 2 wt %, in the total catalyst composition.

In a preferred embodiment of the invention the catalytic agent is a combination of nickel and molybdenum. In a more preferred embodiment of the invention, the resulting catalyst comprises Mo concentrations in the range of about 2 wt % to about 4 wt % and Ni concentrations in the range of about 0.5 wt % to about 2 wt %, said percentages being based on the total catalyst composition.

Suitable metal compounds of Groups 9 and 10 metals include, but are not limited to, metallic salts such as nitrates, acetates and the like. Suitable metal compounds of Group 6 metals include, but are not limited to, ammonium molybdate, molybdic acid, molybdenum trioxide, and the like.

Catalytically active metals contemplated for use in the present invention are preferably used in the form of oxides and/or sulfides of the metals. In the more preferred embodiment of the invention, the catalytically active metals are used in the form of oxides.

Catalyst compositions of the invention may also comprise a phosphorus component. In this case, the impregnating solution may also contain a phosphorus compound, such as for example phosphoric acid, phosphates, and the like, in addition to desired catalytically active metal or metal compounds. Concentrations in the range of about 0 to about 2 wt % phosphorous, based on the total weight of the catalyst composition, are suitable for use in catalysts of the invention.

Following treatment with the desired catalytic agent/s, the catalysts are optionally dried at a temperature in the range of from about 100° C. to 200° C. for about 10 minutes to about 2 hours, and thereafter the resulting catalysts are calcined at a temperature in the range of from about 300° C. to about 600° C. for about 1 hour to about 3 hours, to convert at least part, preferably all, of the metal components or precursors to the oxide form.

As will be clear to a person skilled in the art, there is a wide range of variations on the impregnating method used to support the catalytic active metals on the supports. It is possible to apply a plurality of impregnating steps or the impregnating solutions may contain one or more of the metal components or precursors to be deposited, or a portion thereof. Instead of impregnating techniques, dipping methods, spraying methods and the like can be used. In the case of multiple impregnations, dipping, and the like, drying and/or calcining may be carried out as between steps.

The catalysts of the invention exhibit an increased catalytic activity and stability for hydrodemetallization of a heavy hydrocarbon feedstock containing metals during a hydrotreating process. The heavy hydrocarbon feedstock useful in the present invention can be obtained from any suitable source of hydrocarbons, including, for example, petroleum crude oils and tar sand hydrocarbons, such as, the heavy oils extracted from tar sand. The heavy hydrocarbon feedstock can be a vacuum resid or atmospheric resid component of a petroleum crude oil or a tar sand hydrocarbon. The heavy hydrocarbon feedstock may also include light and heavy gas oils, as well as petroleum crude oil, atmospheric residues and vacuum residues blended with gas oils, particularly vacuum gas oils, crudes, shale oils, and tar sand oils.

The heavy hydrocarbon feedstock generally will include a mixture of hydrocarbons derived from a crude oil or tar sand hydrocarbon material or other source of heavy hydrocarbons. A portion, preferably a major portion, of the heavy hydrocarbons of the mixture has a boiling temperature exceeding about 343° C. (650° F.). The heavy hydrocarbon feedstock is thus defined as having a boiling range, as determined by ASTM test procedure D-1160, such that at least about 20 wt % of the heavy hydrocarbon feedstock boils at a temperature exceeding 524° C. (975° F.). The preferred heavy hydrocarbon feedstock has a boiling range such that at least 30 wt % boils at a temperature exceeding 524° C. (975° F.), and, most preferably, at least 40 wt % of the heavy hydrocarbon feedstock boils at a temperature exceeding 524° C. (975° F.).

The API gravity of the heavy hydrocarbon feedstock can range from about 3 to about 20, but, more specifically, the API gravity is in the range of from 4 to 15, and, more specifically, from 4 to 11.

The heavy hydrocarbon feedstock can have a Conradson carbon residue content, as determined by ASTM testing method D-189, exceeding 5 weight percent and, more specifically, the Conradson carbon residue content is in the range of from 8 weight percent to 30 weight percent.

As earlier noted, the metals contained in the heavy hydrocarbon feedstock can include nickel or vanadium, or both. The nickel concentration in the heavy hydrocarbon feedstock can exceed 10 parts per million by weight (ppmw) or it can exceed 30 ppmw. More specifically, the nickel concentration in the heavy hydrocarbon feedstock can be in the range of from 40 ppmw to 500 ppmw. The vanadium concentration in the heavy hydrocarbon feedstock can exceed 50 ppmw or it can exceed 100 ppmw. More specifically, the vanadium concentration in the heavy hydrocarbon feedstock can be in the range of from 150 ppmw to 1500 ppmw.

Catalysts of the invention are also useful to increase the hydrodesulfurization activity simultaneously with hydrodemetallization during a hydrotreating process where the hydrocarbon feedstock contains both sulfur and metals. The sulfur content of the feed is generally above 0.1 wt % and will frequently be more than 1 wt %.

Further, catalysts in accordance with the present invention provide an increased micro carbon residue (MCR) conversion during a hydrotreating process as compared to prior demetallation and/or desulfurization catalysts prepared from alumina or aluminia titania supports where the supports are calcined at a low temperature (i.e. below 960° C.). Consequently, the hydrotreated hydrocarbon fraction obtained exhibits a reduced MCR content as compared to the MCR content of the starting heavy hydrocarbon feedstock.

A hydrotreating process employing the catalyst compositions of this invention may be carried out under hydrotreating process conditions in an apparatus whereby an intimate contact of the catalyst composition with said metal containing feedstock and a free hydrogen containing gas is achieved, to produce a hydrocarbon-containing product having a reduced level of metals, e.g., nickel and vanadium, and, optionally sulfur. In accordance with the invention, the hydrotreating process is preferably carried out using an Onstream Catalyst Replacement (OCR) technology. Typical hydrotreating process conditions useful in the invention include, but are not limited to, reaction temperatures ranging from about 300° to about 450° C., hydrogen pressures of about 25 to about 200 bar, $H_2$:oil ratios ranging from about 150 to about 1500 Nl/1, and space velocities ($hr^{-1}$) of about 0.1 to about 5. In one embodiment of the invention, the operating conditions for metal containing hydrocarbon feedstock desulfurizaton process include a reaction zone temperature of about 370° C. to about 400° C.' a pressure of about 100 to about 200 bar, and a hydrogen feed rate between about 200 and about 500 Nl/1 of oil feed.

To further illustrate the present invention and the advantages thereof, the following specific examples are given. The examples are given as specific illustrations of the claimed invention. It should be understood, however, that the invention is not limited to the specific details set forth in the Examples.

All parts and percentages in the examples as well as the remainder of the specification that refers to solid compositions or concentrations are by weight unless otherwise specified. However, all parts and percentages in the examples as well as the remainder of the specification referring to gas compositions are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

Five catalysts (A, B, C, D and E) were prepared and their performance evaluated. R values were determined as described hereinabove.

Example 1

Alumina was prepared by co-precipitation by runoff of aqueous streams of aluminum sulfate and sodium aluminate followed by filtration/washing and drying step. The dried powder contains 100% wt % $Al_2O$ (dry basis). The powder contained 32% water.

The alumina powder was peptized by mixing nitric acid/acetic acid and water to form a slurry containing 25% solids. The slurry was formed into spheres on the dripping column. Wet spheres were dried at 120° C. and calcined at 1080° C. for 1 hour in a muffle to give calcined spheres having a R value of 0.47.

The calcined spheres were impregnated with Mo—Ni—P aqueous impregnation solution by incipient wetness technique and then dried and calcined at 510° C. to decompose the Mo—Ni—P impregnation solution compounds. The finished catalyst, identified as Catalyst A, had a nominal active metal content of 3 wt % Mo, 1 wt % Ni, 1 wt % P. Catalyst properties were as identified in Table 1 below.

Example 2

Aqueous streams of aluminum sulfate (7% $Al_2O_3$) and titanium sulfate (9% $TiO_2$) were mixed in a 9:1 ratio to form an aluminum-titanium sulfate mixture. Water (165 gallons) was added to the strike tank and heated to 57° C. and the contents of the strike tank were maintained at this temperature for the remainder of the process. Five gallons of aluminum-titanium sulfate mixture was added to the strike tank prior to precipitation process. After that the aluminum sulfate and titanium sulfate mixture and sodium aluminate were concomitantly added to the strike tank. The aluminum sulfate and sodium sulfate mixture were added at constant flow and the sodium aluminate flow rate was varied to maintain a constant pH of 8.4 in the strike tank. The aluminum-titanium sulfate mixture flow was stopped 50 minutes after the start of the simultaneous aluminum-titanium sulfate mixture and sodium aluminate flows. At this time the concentration of precipitated titania-alumina solids was about 6 wt %. The sodium aluminate flow was reduced to 0.7 gallons per minute and turned off when a pH of 9.2 was obtained in the strike tank. The precipitated titania alumina mix was then filtered and washed on a filter belt to remove residual sodium sulfate. The resulting filter cake was then spray dried. Dried titania alumina powder was then used to make a catalyst support.

The dried titania alumina powder contains 3.5 wt. % $TiO_2$ (dry basis) and the balance (dry basis) is alumina ($Al_2O_3$). The powder contained 26% water. The titania-alumina powder was peptized by mixing nitric acid/acetic acid and water to form a slurry containing 24% solids. The slurry was formed into spheres on a dripping column. Wet spheres were dried at 120° C. and calcined at a temperature of 1010° C. for 1 hour in a muffle to form spheres having a R value of 0.69.

The calcined spheres were impregnated with Mo—Ni—P aqueous impregnation solution by incipient wetness technique and then dried and calcined at 510° C. to decompose the Mo—Ni—P impregnation solution compounds. The finished catalyst, identified as Catalyst B, had a nominal active metal content of 3 wt % Mo, 1 wt % Ni and 1 wt % P. Catalyst properties were as identified in Table 1 below.

Example 3

Aqueous streams of aluminum sulfate (7% $Al_2O_3$) and titanium sulfate (9% $TiO_2$) were mixed in a 9:1 ratio to form an aluminum-titanium sulfate mixture. City water (210 gallons) was added to the strike tank and heated to 68° C. and the contents of the strike tank were maintained at this temperature for the remainder of the process. Flows of aluminum-titanium sulfate mixture and sodium aluminate were then concomitantly added to the strike tank. The sodium aluminate flow rate was varied to maintain a constant pH of 7.6 in the strike tank. The aluminum-titanium sulfate mixture flow was stopped 22 minutes after the start of the simultaneous aluminum-titanium sulfate mixture and sodium aluminate flows. Sodium aluminate flow was turned off when a pH of 9.2 was obtained in the strike tank. The precipitated titania alumina mix was then filtered and washed on a filter belt to remove residual sodium and sulfate. The resulting filter cake was then spray dried. Dried titania alumina powder was then used to make catalyst support.

The dried powder contains 3.5 wt. % $TiO_2$ (dry basis) and the balance (dry basis) is alumina ($Al_2O_3$). The powder contained 26% water. The titania alumina powder was peptized by mixing nitric acid/acetic acid and water to form a slurry containing 30% solids. The slurry was formed into spheres on a dripping column. Wet spheres were dried at 120° C. and calcined at a temperature of 1050° C. for 1 hour in a muffle to form spheres having a R value of 0.76.

The calcined spheres were impregnated with Mo—Ni—P aqueous impregnation solution by incipient wetness technique and then dried and calcined at 510° C. to decompose the Mo—Ni—P impregnation solution compounds. The finished catalyst, identified as Catalyst C, had a nominal active metal content of 3 wt % Mo, 1 wt % Ni and 1 wt % P. Catalyst properties were as identified in Table 1 below.

Example 4

Aqueous streams of aluminum sulfate (7 wt % $Al_2O_3$) and titanium sulfate (9 wt % $TiO_2$) were mixed in a 9:1 ratio to form an aluminum-titanium sulfate mixture. City water (270 gallons) was added to the strike tank and heated to 66° C. and the contents of the strike tank were maintained at this temperature for the remainder of the process. Four gallons of aluminum-titanium sulfate mixture was added to the strike tank. Flows of aluminum-titanium sulfate mixture and sodium aluminate were then concomitantly added to the strike tank. The sodium aluminate flow rate was varied to maintain a constant pH of 7.6 in the strike tank. The aluminum-titanium sulfate mixture flow was stopped 22 minutes after the start of the simultaneous aluminum-titanium sulfate mixture and sodium aluminate flows. Sodium aluminate flow was turned off when a pH of 9.2 was obtained in the strike tank. The precipitated titania alumina mix was then filtered and washed on a filter belt to remove residual sodium and sulfate. The resulting filter cake was then spray dried. Dried titania alumina powder was then used to make catalyst support.

The dried powder contains 3.5 wt. % TiO2 (dry basis) and the balance (dry basis) is alumina ($Al_2O_3$). The powder contained 26% water. The titania alumina powder was peptized by mixing nitric acid/acetic acid and water to form a slurry containing 23% solids. The slurry was formed into spheres on a dripping column. Wet spheres were dried at 120° C. and calcined at a temperature of 1057° C. for 1 hour in a muffle to form spheres having a R value of 0.91.

The calcined spheres were impregnated with Mo—Ni—P aqueous impregnation solution impregnation solution compounds. The finished catalyst, identified as Catalyst D, had a nominal active metal content of 3 wt % Mo, 1 wt % Ni and 1 wt % P. Catalyst properties were as identified in Table 1 below.

TABLE 1

Catalyst Properties of Catalysts A-D

|  | Catalyst A | Catalyst B | Catalyst C | Catalyst D |
|---|---|---|---|---|
| Titania Content, wt % | 0 | 3.5 | 3.5 | 3.5 |
| SA, m2/g | 96 | 103 | 94 | 102 |
| PV, cm3/g | 0.79 | 0.90 | 0.83 | 0.96 |
| PSD, vol % |  |  |  |  |
| <100 Å | 0.6 | 0.0 | 0.0 | 0.0 |
| 100-200 Å | 27.6 | 15.0 | 18.9 | 16.7 |
| 200-500 Å | 32.5 | 48.9 | 39.5 | 36.7 |
| >500 Å | 39.6 | 36.3 | 41.4 | 46.6 |
| >1,000 Å | 35.7 | 30.4 | 35.9 | 40.4 |

Example 5

Titania alumina spheres were prepared as described in Example 4 above with the exception that the dried spheres were calcined at a temperature of 600° C. in order to obtain a mesopore structure with smaller pore diameters. The R value of the calcined spheres was 0.15. The pore structure of Catalyst E was similar to the pore structure of a low temperature calcined desulfurization catalyst. Properties of Catalyst E are shown in Table 2 below.

TABLE 2

Properties of Catalyst E

|  | Catalyst E |
|---|---|
| SA, m2/g | 231 |
| PV, cm3/g | 0.71 |
| PSD, vol % |  |
| <50 Å | 7.5 |
| 50-100 Å | 68.3 |
| 100-200 Å | 11.8 |

TABLE 2-continued

Properties of Catalyst E

|  | Catalyst E |
|---|---|
| 200-500 Å | 6.8 |
| >500 Å | 5.5 |

Example 6

Catalysts A, B, C, D and E were evaluated for performance in a hydrotreating process as described hereinafter. The catalyst pellets were loaded in a plug-flow reactor. The feed consisted of an atmospheric resid and hydrogen. The resid had a metal content of 362 ppm V and 71 ppm Ni and a Sulfur content of 4.6 wt %. The reactor temperature was maintained at different levels between 395-375° C., and the average hourly space velocity was 0.8 L/(L·h). Comparative results for metal and sulfur conversion are given in Table 3 below. The results are given at three different time-on-stream values (210, 402, and 738 hours) and the corresponding reactor temperatures.

TABLE 3

Catalyst Testing Results

|  | Vanadium conversion, % | | | Nickel conversion, % | | | Sulfur conversion, % | | | MCR conversion, % | | |
|---|---|---|---|---|---|---|---|---|---|---|---|---|
|  | at 210 h, 395° C. | at 402 h, 390° C. | at 737 h, 385° C. | at 210 h, 395° C. | at 402 h, 390° C. | at 737 h, 385° C. | at 210 h, 395° C. | at 402 h, 390° C. | at 737 h, 385° C. | at 210 h, 395° C. | at 402 h, 390° C. | at 737 h, 385° C. |
| Catalyst A | 68.5 | 60.4 | 51.2 | 52.4 | 46.3 | 39.2 | 45.2 | 40.8 | 40.1 | 27.8 | 25.5 | 23.8 |
| Catalyst B | 71.2 | 63.2 | 53.1 | 55.8 | 49.4 | 41.0 | 58.8 | 52.3 | 41.1 | 35.9 | 32.0 | 26.2 |
| Catalyst C | 72.8 | 67.9 | 54.8 | 54.8 | 49.9 | 38.7 | 51.8 | 47.2 | 35.8 | 32.5 | 30.8 | 24.3 |
| Catalyst D | 74.6 | 67.5 | 58.8 | 57.9 | 52.2 | 45.8 | 48.7 | 43.0 | 37.1 | 33.6 | 30.5 | 26.8 |
| Catalyst E | 66.3 | 55.8 | 41.0 | 48.4 | 40.3 | 28.7 | 46.2 | 45.3 | 31.5 | 29.4 | 28.3 | 20.6 |

As shown in the Table 3 above, Catalysts B, C and D, being promoted with titania and having a pore structure according to the present invention, exhibited enhanced performance for metal, sulfur and MCR conversion when compared to the performance of Catalyst A (alumina only). While Catalyst E exhibited an initial performance comparable to Catalyst A, the performance of Catalyst E for conversion of metals, sulfur and MCR unexpectedly declined over time evidencing a lack of stability.

Reasonable variations, modifications and adaptations of the invention can be made within the scope of the described disclosure and the appended claims without departing from the scope of the invention.

The invention claimed is:

1. A calcined spheroidal catalyst support comprising co-precipitated titania alumina having less than 5 wt % titania based on the total titania alumina, said support having a total pore volume in the range of about 0.7 to about 1.2 cc/g, and a pore volume distribution such that greater than 40% of the total pore volume have pores in a diameter larger than 200 Å, about 30% or greater of the total pore volume have pores in the range of about 200 Å to about 500 Å, and, greater than 10% of the total pore volume have pores with a diameter above 1000 Å; wherein:
  (a) the co-precipitated titania alumina results from simultaneous co-precipitation of aqueous solutions of aluminum sulfate, sodium aluminate and titanium sulfate; and
  (b) the calcined support has been calcined at a temperature of about 960° C. to about 1100° C.

2. The support of claim 1 having a total pore volume in the range of about 0.8 to about 1.1 cc/g.

3. The support of claim 1 wherein titania is present in the co-precipitated titania alumina in an amount ranging from about 2.5 to about 4.0 wt % titania, based on the total weight of the titania alumina.

4. The support of claim 1 wherein the support comprises at least 90wt % titania alumina having an alumina R value of from about 0.4 to about 1.7, wherein R is the ratio between the integrated intensity of the X-ray diffraction peak at $2\Theta=32°$ and the integrated intensity of the X-ray diffraction peak at $2\Theta=46°$.

5. The support of claim 1 wherein from about 50% to about 90% of the total pore volume is in pores having a diameter larger than 200 Å; from about 30% to about 80% of the total pore volume is in pores having a diameter from about 200 to about 500 Å; and greater than 15% of the total pore volume of the support have pores in a diameter above 1000 Å.

6. The support of claim 1 wherein from about 30% to about 80% of the total pore volume is in pores having a diameter from about 200 to about 500 Å.

7. The support of claim 1 wherein greater than 15% of the total pore volume of the support is in pores having a diameter above 1000 Å.

8. A calcined spheroidal catalyst support comprising co-precipitated titania alumina having less than 5 wt % titania based on the total titania alumina, said support having a total pore volume in the range of about 0.7 to about 1.2 cc/g, and a pore volume distribution such that greater than 40% of the total pore volume have pores in a diameter larger than 200 Å, about 30% or greater of the total pore volume have pores in the range of about 200 Å to about 500 Å and, greater than 30% of the total pore volume have pores with a diameter above 1000 Å.

9. The support of claim 8 having a total pore volume in the range of about 0.8 to about 1.1 cc/g.

10. The support of claim 8 wherein titania is present in the co-precipitated titania alumina in an amount ranging from about 2.5 to about 4.0 wt % titania, based on the total weight of the titania alumina.

11. The support of claim 8 wherein the support comprises at least 90 wt % titania alumina having an alumina R value of from about 0.4 to about 1.7, wherein R is the ratio between the integrated intensity of the X-ray diffraction peak at $2\Theta=32°$ and the integrated intensity of the X-ray diffraction peak at $2\Theta=46°$.

12. The support of claim 8 wherein from about 50% to about 90% of the total pore volume is in pores having a diameter larger than 200 Å; from about 30% to about 80% of the total pore volume is in pores having a diameter from about 200 to about 500 Å; and greater than 15% of the total pore volume of the support have pores in a diameter above 1000 Å.

13. The support of claim 8 wherein from about 30% to about 80% of the total pore volume is in pores having a diameter from about 200 to about 500 Å.

14. The support of claim 8 wherein greater than 15% of the total pore volume of the support is in pores having a diameter above 1000 Å.

15. The support of claim 8 wherein the support has been calcined at a temperature of about 960° C. to about 1100° C.

* * * * *